Feb. 5, 1952     R. R. CURTIS     2,584,188
DRAIN VALVE
Filed Jan. 30, 1946
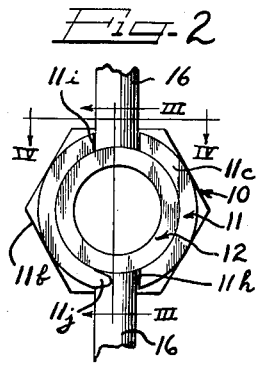
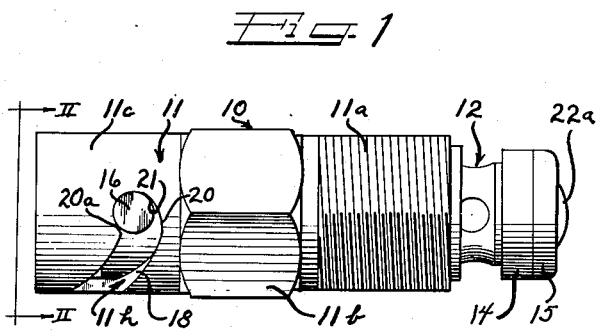
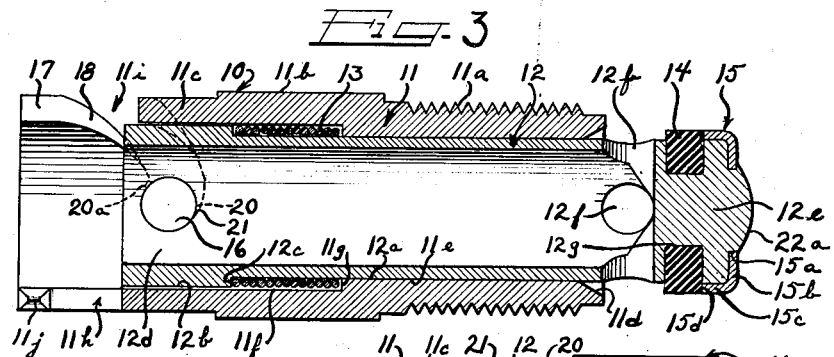
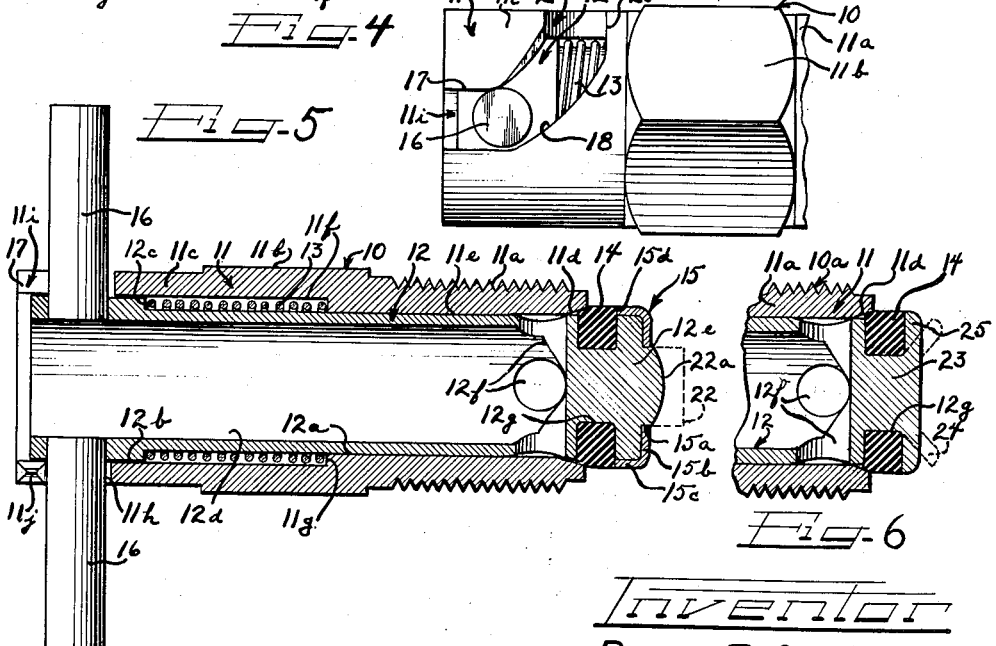
Inventor
Russell R. Curtis Patented Feb. 5, 1952

2,584,188

UNITED STATES PATENT OFFICE 2,584,188

DRAIN VALVE

Russell R. Curtis, Dayton, Ohio, assignor, by mesne assignments, to Curtis Automotive Devices, Inc., Dayton, Ohio, a corporation of Ohio Application January 30, 1946, Serial No. 644,387

1 Claim. (Cl. 251—132)

This invention relates to shut-off valves or drain cocks and specifically deals with a drain valve having an open-ended hollow plug housing adapted to be threaded into a tank, a radiator, a pipe, or a crankcase or the like, together with a hollow tubular valve member slidable in the housing and carrying, at one end, a resilient seal to act on the adjacent end of the housing for closing the valve, as well as operating handles projecting into bayonet slots at the other end of the housing for moving the valve between open and closed positions.

This application is a continuation-in-part of my copending application entitled: "Drain Cock," Serial No. 573,433, filed January 18, 1945, now abandoned.

According to this invention, a hollow open-ended plug-like housing has a beveled valve-seating face at one open end thereof and diametrically opposed bayonet slots in the other end thereof. These bayonet slots are arranged with axially extending outer end portions, oppositively sloping relatively steep inclined portions inwardly from the axially extending portions and horizontal recessed inner end portions at the bottoms of the inclined portions. The hollow valve member is slidably mounted in the plug-like housing and has a solid end or head carrying a resilient sealring such as a rubber grommet. This seal ring projects radially beyond the head to seat on the beveled seating face at the adjacent end of the plug housing. A feature of the invention includes the provision of means on the head of the valve member for backing up the projecting portion of the seal ring to hold the ring on the head even when it is seated against the housing with appreciable force. The valve member has radial ports inwardly of the head for flow of fluid into the hollow valve member when the seal ring is moved away from its seat. The housing preferably has an enlarged counterbore in the end thereof remote from the beveled seat-defining end, and a shoulder is provided in the housing at the bottom of this counterbore. The hollow valve member has an enlarged head slidable in this counterbore and providing a shoulder opposing the shoulder in the housing. A compression spring surrounds the valve member and is seated on the shoulders of the housing and valve member respectively to urge the valve member into closed position. The head end of the valve member has handles projecting radially therefrom through the bayonet slots. At least one outer extremity of a bayonet slot has a projection thereon extending into the bayonet slot to form a stop for the handle operating in this slot for preventing release of the valve member from the housing in the event of disintegration of the resilient seal ring. This stop will act on the handle to prevent the spring from pushing the valve member out of the bayonet slotted end portion of the housing.

The configuration of the bayonet slots is such that the handles can only be moved from their outermost positions in a straight axial direction to crack the valve for unseating the resilient ring without subjecting the ring to shearing action such as would occur by rotation of the ring on the seat of the housing. The inclined portions of the bayonet slots then guide the handles to rotate the valve and move the sealing ring to a fully opened position away from its seat. In this position the ports of the valve project beyond the end of the housing. Further rotation of the valve handles will move the same into the recessed horizontal inner end portions of the bayonet slots and these recessed portions will retain the handles to hold the valve in open position. The recesses have seats which will retain the handles and the spring will urge the handles against these seats until the handles are depressed and reversely rotated into the inclined portions of the slots whereupon the spring will automatically move the handles into the axial outer ends of the slots and close the valve.

The bayonet slots, therefore, so guide the handles that the valve is first moved from its closed position to a cracked or partially opened position in a straight axial direction, and is then partially rotated and axially moved to a fully opened position in which it is retained by the recesses at the inner ends of the slots until the handles are reversely rotated, whereupon the spring will automatically close the valve.

The drain valves of this invention are easily assembled by dropping the spring into the counterbore of the housing plug, by inserting the hollow tubular valve with the handles thereon into the housing, by seating the handles in the recesses at the inner ends of the bayonet slots, by placing a rubber grommet in a groove provided in the head end of the tubular valve, by placing a backing-up member or cap on the head end of the valve to act against the projecting portion of the grommet in opposed relation to the valve seat of the housing, and by staking metal at the outer end of one of the bayonet slots to form a projection to act as a stop for the handle.

It is, then, an object of this invention to provide a drain valve, suitable for draining radiators, tanks, crankcases, and the like embodying a hollow open-ended tubular plug housing, a hollow tubular valve slidable in the housing and having a closed head carrying a rubber grommet for seating on an end of the housing, a spring for urging the valve into closed position, and handles on the valve riding in bayonet slots in the housing to shift the valve between open and closed positions without subjecting the grommet to shearing stresses.

A further object of the invention is to provide a drain valve with a tubular valve member actuated by a bayonet slot type cam which first cracks the valve by moving the tubular valve member in a straight axial direction, which then rotates the valve to a fully opened position and next retains the valve in the fully opened position.

A further object of the invention is to provide a drain valve having a resilient sealing ring carried by a tubular valve member and including means for bottoming the sealing ring to hold it in operative position even when it is seated with considerable force.

Another object of the invention is to provide a drain valve with operating cams that will hold the valve in opened position and will not interfere with full seating of the valve in fully closed position.

A further object of the invention is to provide a valve with a tubular slidably mounted valve member that carries a rubber seating ring in such a manner that the ring will not be separated therefrom nor subjected to excessive deflection tending to separate it from the tubular valve member.

A specific object of the invention is to provide a valve member carrying a resilient sealing ring in radially projecting relation and having a cap member secured thereon to bottom the radially projecting portion of the ring.

Another specific object of the invention is to provide a valve member carrying a resilient sealing ring in a groove and having one of the groove-defining walls projecting beyond the opposed groove-defining wall to back up the outer extremity of the seal ring.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view of a drain valve according to this invention illustrating the valve in opened position.

Figure 2 is an end elevational fragmentary view taken along the line II—II of Figure 1, but illustrating the valve in closed position.

Figure 3 is an axial cross-sectional view of the valve taken along the line III—III of Figure 2, but illustrating the valve in opened position wherein the valve member is rotated 90° from the position shown in Figure 2.

Figure 4 is a fragmentary side elevational view taken along the line IV—IV of Figure 2.

Figure 5 is a view similar to Figure 3, but illustrating the valve in closed position and showing, in dotted lines, the manner in which the cap member is secured on the head end of the valve.

Figure 6 is a fragmentary axial cross-sectional view of the head end of a modified drain valve according to this invention illustrating, in dotted lines, the initial shape of the head end of the valve.

As shown on the drawings:

The drain valve 10 of this invention, as shown in Figures 1 to 5, is composed of a tubular open-ended plug housing 11, a tubular valve member 12 slidably mounted in the housing, a spring 13 surrounding the valve 12 and encased in the housing 11 for urging the valve member into closed position, a rubber grommet or sealing ring 14 carried by the valve member 12, an end cap 15 on the valve member 12 for backing up the grommet 14, and handles 16 projecting radially from the valve member 12.

The housing 11 has an externally threaded portion 11a for threaded engagement in a tank, radiator, crankcase or the like, an intermediate wrench-receiving head 11b for tightening the threaded end 11a into position, and a slotted cylindrical end portion 11c. The end face of the threaded end 11a of the housing is internally beveled to provide a valve-seating face 11d. This face 11d converges to a cylindrical bore 11e extending through the portion 11a of the housing and into the portion 11b of the housing. A counterbore 11f is provided through the portion 11c of the housing into the portion 11b to terminate at a shoulder 11g connecting the counterbore with the bore 11e.

The portion 11c of the housing has a pair of diametrically opposed bayonet slots 11i and 11h extending inwardly from the free end thereof. Each bayonet slot 11h and 11i has the portion 17 extending axially inward from the end wall of the portion 11c to a relatively steep inclined portion 18. The inclined portions 18 of the slots 11h and 11i extend in opposite directions on opposite sides of the portion 11c to inner end horizontal portions 20. The portions 20 of each slot are offset 90° from the portions 17. Each portion 20 has a seating face 20a providing a reentrant recess 21 that is somewhat axially offset from the inner end of the sloping portion toward the outer end of each slot. This provides a locking recess which will retain the handle 16. The bayonet slots are thus arranged to provide cams for handles 16 which guide the valve member 12 in a straight axial direction along the portion 17 of the slots and then rotate the valve member 12 through a quarter of a turn along the oppositely inclined portions 18 of the slot while further moving the valve member in an axial direction to a fully opened position. At the inner ends of the slots the handles are guided by the substantially circumferential portions 20 in a direction substantially transverse to the axis of the housing for rotating the valve member without axial movement. As the handles are seated on the locking faces 20a of the recesses or inner ends 20 of the slots, the valve member is retracted a slight axial distance so that the handles will become locked in the recesses to hold the valve member in an opened position. The valve member is thus rotated a quarter of a turn between its opened and closed positions but with all movement of the rubber sealing ring 14 carried by the valve member onto and off of its seat 11d being in a straight axial direction, without rotation.

Metal of the portion 11c of the housing is pinched or staked into one of the slots, such as the slot 11h, to form a projection or nib 11j at the free end of the axial portion 17 of the slot for overlying the handle 16 that rides in the slot. This projection 11j is normallly spaced from the handle 16 as shown in Figure 4 of the drawings even when the valve is in its fully closed position. However, in the event of failure of the sealing ring 14, the spring 13 will urge the valve member 12 toward the open end of the housing 11. The projection 11j thereupon engages the handle to retain the valve member in the housing.

As best shown in Figures 3 and 5, the valve member 12 is in the general form of a cylindrical tube having a straight cylindrical outer wall 12a along the major portion of its length and sliding in the bore 11e of the housing. The valve member 12 has an enlarged diameter cylindrical head portion 12b fitting rather freely in the counterbore 11f of the housing 11. A shoulder 12c is provided between the portions 12a and 12b to receive the spring 13 thereagainst. A straight cylindrical bore or passageway 12d extends inwardly from the head end 12b of the valve member 12 to a solid end 12e. This solid end or head 12e forms an end wall for the bore 12d, and radial bores 12f in right angular relation through the valve member 12 adjacent the end 12e intersect the bore or passageway 12d to provide drainage ports through which fluid can flow into the bore 12d when the valve is in opened position as shown in Fig. 3. These ports are retracted into the housing 11 when the valve is closed as shown in Figure 5.

The end 12e of the valve has a circumferential groove 12g therearound receiving the sealing ring 14. This groove 12g has flat opposed side walls and a flat bottom.

A nubbin or cylindrical lug 22 is initially formed on the axial central portion of the end 12e as shown in dotted lines in Figure 5. This nubbin 22 has a diameter materially less than the end 12e.

The cap member 15, composed of metal or other rigid retaining material, has a central aperture 15a adapted to embrace the nubbin 22. A top wall 15b on the cap overlies the end portion 12e and extends radially outward from the aperture 15a to a skirt or flange portion 15c which surrounds the head 12e and provides a rim surface or end 15d overlying and backing up the radially extending portion of the sealing ring 14. The cap 15 is secured in position on the end 12e by peening or spinning the nubbin 22 to form a head 22a overlying the aperture 15a of the cap and forming a rivet-like retainer for the cap.

The sealing ring 14 is of rectangular cross section to snugly fit the groove 12g. It can be inexpensively formed by slicing a straight cylindrical rubber tube into ring segments with flat parallel side walls. The ring is adapted to be stretched over the end 12e to be snapped into the groove 12g. The cap 15 is then mounted on the end 12e and, as shown in Figures 3 and 5, this cap will back up or bottom the radially projecting portion of the ring 14 on one side face of the ring. The other side face of the ring projects radially beyond the end 12e to engage the beveled seat 11d and, as shown in Figure 5, this projecting portion will be resiliently deformed into seating conformity with the beveled seat 11d when the spring 13 is allowed to urge the valve member into its closed position. In this closed position, the ports 12f are retracted into the bore 11e of the housing, and are sealed by the seating engagement of the ring 14 on the seat 11d. The passageway 12d of the valve member is thereby closed.

As explained above, in order to open the valve from the closed position shown in Figure 5, it is merely necessary to grasp the handles 16 and move them axially inward along the portion 17 of the bayonet slots. Further axial inward movement will be partially translated into rotative movement along the portions 18 of the slots which guide the handles to the horizontal portions 20 of the slots into the recesses 21. This movement will axially shift and rotate the valve member 12 to position the ports 12f thereof beyond the seating face 11d of the housing. However, the valve is first cracked to move the sealing ring 14 away from its seat 11d without rotating the valve or sealing ring. Thus the valve is first moved in a straight axial direction along the portion 17 of the slots and shearing stresses on the rubber sealing ring are eliminated.

In the modified valve 10a shown in Figure 6, the valve member 12 has a different end portion or head 23 for carrying the sealing ring 14. In this figure, parts identical with parts described in connection with Figures 1 to 5 have been marked with the same reference numerals. As shown, the end 23 has the same groove 12g for receiving the sealing ring 14 as the end 12e. However, the cap member 15 is dispensed with and the extremity of the end 23 is initially formed at an angle to provide a tilted flange 24 as shown in dotted lines. This tilted flange will have the major diameter thereof the same as the end 12e for the valve 12 and can be formed without loss of stock on a screw machine or the like, which cuts the reduced-diameter portion 12a, the head 23, and the groove 12g in a cylindrical tube having an initial diameter the same as the head portion 12b. This tilted portion 24 can receive the sealing ring 14 thereover to allow the ring to be snapped into the bottom of the groove 12g. The tilted portion is then flattened to provide the end wall 25 for the groove 12g in spaced parallel relation with the opposed end wall of the groove. The portion 25 will extend radially outward to the major diameter of the sealing ring 24 to back up the portion of the sealing ring which projects from the end 23 and thus serves the same function as the rim edge 15d of the cap 15.

From the above descriptions it will be understood that the invention provides a drain valve composed of nested hollow plug housing and valve parts. The housing has diametrically opposed bayonet slots receiving handles on the valve part to provide cams for these handles to operate the valve between opened and closed positions relative to the housing. The valve carries a resilient sealing ring, such as a rubber grommet of rectangular cross section sliced from a rubber tube, to seat on a seat provided in the end face of the plug housing. The bayonet slots are so arranged that this sealing ring will never be rotated against the housing seat and therefore is not subjected to shearing action. The valve can be locked in opened position by recesses provided in the inner ends of the bayonet slots. A quarter-turn rotation of the valve member in the housing will move it from fully closed to fully opened position. The valve member is arranged to back up the rubber sealing ring on the end face thereof opposite its sealing face so that the ring can be deformed and subjected to considerable axial force without being sheared or tilted out of its engagement with the valve.

It will, of course, be understood that various details of construction may be varied through a wide range without departing from the principles of this invention and it is, therefore, not the pur-

I claim as my invention:

A drain valve comprising a tubular valve body having a valve seat at one end and oppositely inclined bayonet slots in the other end, a tubular valve member slidably mounted in said body having a closed end adjacent the valve seat, said valve member having openings therethrough adjacent said closed end to connect the interior of the valve member with the space surrounding the valve seat end of the body, a spring in said body acting on the valve member to urge it toward the slotted end of the body for retracting the openings into the body, radially projecting means on the closed end of the valve member for engaging said valve seat of the body, radially extending handles on the open end of the valve member extending through said bayonet slots, said bayonet slots having reentrant recesses at the inner ends thereof to retain said handles for holding the valve member in opened position with the ports thereof extending beyond the valve seat of the body, and said slotted end of the body having a projection extending into the outer free end of one of said bayonet slots for engaging one of said handles to prevent accidental removal of the valve member from the body.

RUSSELL R. CURTIS.

REFERENCES CITED

The following references are of record in the file of this patent:

UNITED STATES PATENTS

| Number | Name | Date |
|---|---|---|
| 645,078 | Field | Mar. 13, 1900 |
| 1,291,843 | Green | Jan. 21, 1919 |
| 1,560,770 | Everstrom | Nov. 10, 1925 |
| 1,954,986 | Carlson | Apr. 17, 1934 |
| 2,128,520 | Armstrong | Aug. 30, 1938 |
| 2,310,599 | Roach | Feb. 9, 1943 |

FOREIGN PATENTS

| Number | Country | Date |
|---|---|---|
| 2,315 | Germany | of 1878 |
| 76,466 | Germany | of 1894 |
| 213,042 | Great Britain | of 1924 |